July 27, 1954  W. C. HAGEN  2,684,701
POTATO PEELER HAVING A PEELINGS DISCHARGE OPENING
Filed Oct. 24, 1950  2 Sheets-Sheet 1

WILLIAM C. HAGEN
INVENTOR.

BY *Robt Meyer*
attorney

July 27, 1954   W. C. HAGEN   2,684,701
POTATO PEELER HAVING A PEELINGS DISCHARGE OPENING
Filed Oct. 24, 1950   2 Sheets-Sheet 2

WILLIAM C. HAGEN
INVENTOR.

BY

Patented July 27, 1954

2,684,701

UNITED STATES PATENT OFFICE 2,684,701

POTATO PEELER HAVING A PEELINGS DISCHARGE OPENING

William Christian Hagen, East Orange, N. J.

Application October 24, 1950, Serial No. 191,827

2 Claims. (Cl. 146—49)

This invention relates to devices for peeling potatoes, and an object of the present invention is to provide a simple, inexpensive device, applicable for use in restaurants, etc., for peeling potatoes in quantity.

A further object of the present invention is to provide a potato peeler, which is a dry peeler, that is, one which does not require or use water during the peeling operation and, therefore, does not require any sewer outlet connection or water supply connection, eliminating the troublesome clogging of the sewer outlet and permitting the placing of the peeler in any convenient location regardless of water and sewer connection locations.

Another object of the present invention is to provide a batch potato peeler, which will eliminate the disadvantage of handling the potatoes individually in removing them from the peeler, the entire batch peeled being removed at one operation, and a dry potato peeler which provides means for effectively removing the skins as they are peeled from the potatoes thereby preventing clogging of the peeler and "messy" conditions of the potato or peeler.

Also, the peeling device of the present invention may be employed for grating potatoes or other similar vegetables or fruits when it is desired to obtain a relatively fine grated product.

With these and other objects in view, as may appear from the accompanying specification, the invention consists of various features of construction and combination of parts, which will be first described in connection with the accompanying drawings, showing a potato peeler of a preferred form embodying the invention, and the features forming the invention will be specifically pointed out in the claims.

In the drawings:

Figure 1 is a view partly in side elevation and partly in section of the improved potato peeler.

Figure 3:
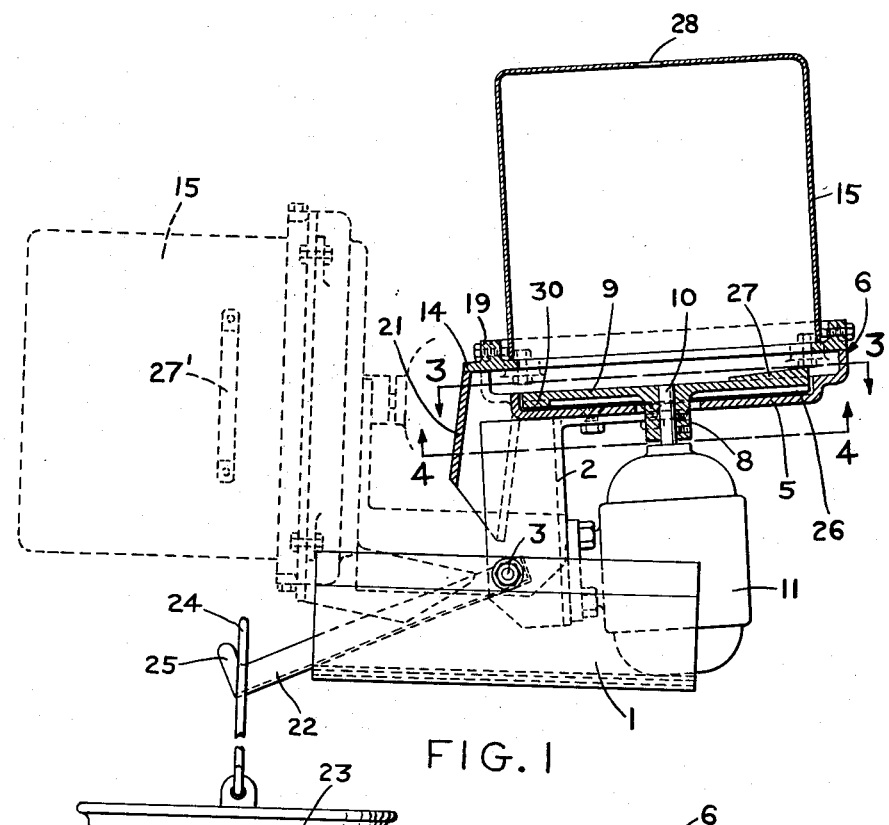
Figure 3 is a horizontal section taken on the line 3—3 of Figure 1.
Figure 4:
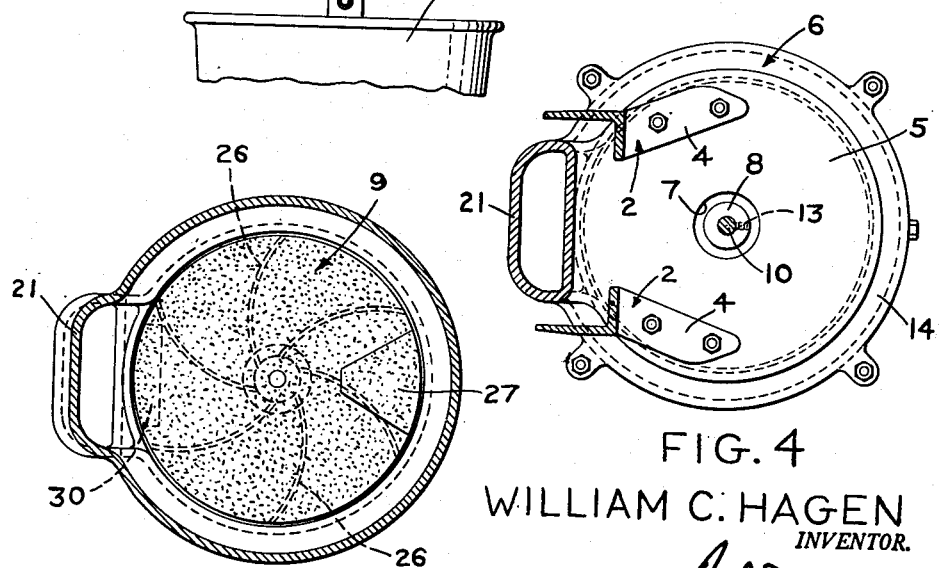
Figure 4 is a horizontal section taken on the line 4—4 of Figure 1.
Figure 2:
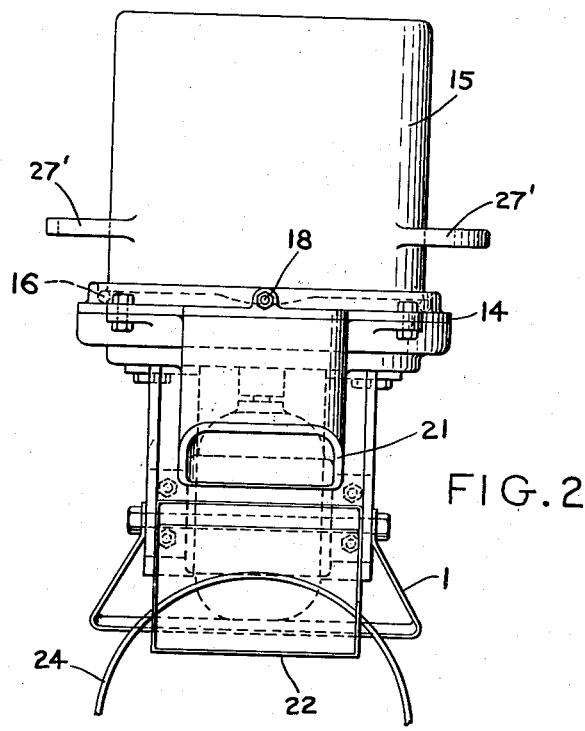
Figure 2 is a side elevation of the potato peeler taken at right angles to that shown in Figure 1.

Referring more particularly to the drawings, the improved vegetable or potato peeler includes a supporting base 1 of any suitable shape or construction to which is pivotally connected brackets 2 by means of the pivotal bolt 3. The brackets 2 have right angularly extending flanges 4 which are attached to the undersurface of the bottom 5 of the housing 6. The bottom 5 has a centrally or axially disposed opening 7 therein through which the bearing 8 formed on the rotary peeling disc 9 extends. The bearing 8 receives the shaft 10 of an electric motor 11 and is attached thereto for rotation therewith in any suitable manner such as by set screws 13.

The rotary peeling or abrasive disc 9 seats and rotates in a depression in the housing 6 as clearly shown in Figure 1 of the drawings and it has its upper surface constructed so as to provide an abrasive, as clearly shown in Figure 3 of the drawings. The upper abrasive surface of the rotary disc 9 may be made or provided in any suitable manner such as by attachment to the face of the disc of abrasive material or by the formation of file-like abrasive elements on the face of the disc. The housing 6 has an annular flange 14 thereon spaced a short distance upwardly from the upper surface of the rotary abrasive disc 9 which flange extends inwardly and forms a supporting surface for the pot or container 15 which contains potatoes or vegetables during the peeling operation.

Figure 6:
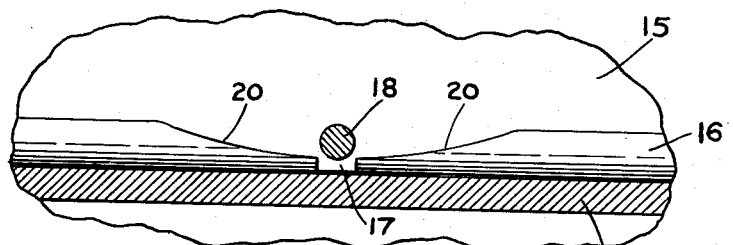
Figure 6 is a detail section taken on the line 6—6 of Figure 5.
Figure 5:
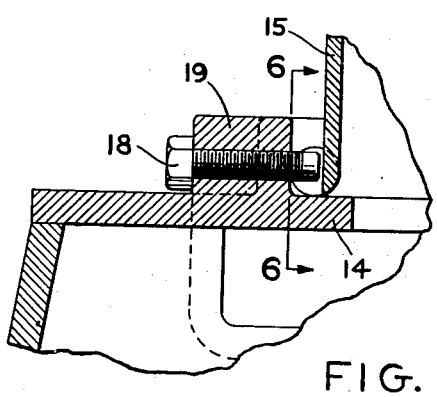
Figure 5 is an enlarged detail vertical section of the potato peeler illustrating the manner of locking the pot or container in position.

The pot or container 15 has an annular bead 16 formed about the outer surface of its open end, which bead is interrupted at diametrically opposed points to provide open spaces 17 (see Figure 6 of the drawings) for receiving the ends of the locking set screws 18 therethrough. The locking set screws 18 are adjustably carried by an annular upright flange 19 formed on the housing 6. The bead 16 is tapered in both directions from the interruptions or cutouts 17 so that after the pot 15 has been placed on the flange 14 so that the locking pins 18 will pass through the cutouts 17 a slight rotation of the pot in either direction will cause a locking engagement between the set screws 18 and the bead 16 to lock the pot 15 upon the flange 14 in potato peeling position.

The housing 6 has a peeling dispensing spout 21 formed thereon which extends outwardly and downwardly from the housing at one side thereof and is open into the housing in the space above the abrasive surface of the rotary disc 9. The spout 21 delivers the peelings upon a trough 22 carried by the brackets 2 which in turn may deliver the peelings into a bucket or other suitable container shown at 23. The bail 24 of the bucket 23 engages over suitable holding abutments 25 formed on the trough 22.

The rotary abrasive disc 9 has a plurality of arcuate vanes 26 formed on its undersurface which will pick up and force any fine grated peelings which pass beneath the disc 9 outwardly into the spout 21 so as to prevent clogging of the apparatus during operation.

For the purpose of facilitating the peeling of potatoes having flats thereon substantially triangularly shaped segment 27 is formed or mounted upon the upper abrasive surface of the rotary disc 9. The segment 27 increases both in cross sectional area and in thickness as it extends outwardly to the rim of the disc, as clearly shown in Figure 3 of the drawings. The segment 27 has an outer abrasive surface and it extends inwardly towards the axis of the disc 9 having its innermost end positioned a predetermined relatively short distance outwardly of the axis of the disc. A counterweight 30 is provided on the undersurface of the abrasive disc 9 diametrically opposite to the segment 27 to compensate for the weight of the segment and balance the weight of the segment during rotation of the disc.

In operation, the pot 15 is removed from resting upon the flange 14, its turning movement being facilitated by the handles 27' thereon after the device has been moved into the tilted position shown in dotted lines in Figure 1 of the drawings. The removed pot or container is then filled with potatoes or other vegetables or the like to be peeled after which its inner open end is placed facing the rotary abrasive disc 9 and the pot is locked in place on the flange 14. The device is then tilted to its upright position as shown in solid lines in Figure 1 of the drawings and the motor 11 started. The starting of the motor 11 rotates the abrasive disc 9 which causes not only a tumbling action of the potatoes in the pot 15 but removes the peelings from the potatoes by contact of the potatoes or the like with the abrasive surface of the rotary disc 9. It has been found that a quantity of potatoes, such as approximately fifteen pounds, put in the pot 15 will be thoroughly peeled in a few seconds of operation of the device.

As clearly shown in Figure 1 of the drawings, the disc 9 is, when the device is in an upright position, supported at a slight angle to the horizontal rather than in a true horizontal position and it has been found that more thorough and efficient peeling is provided if the disc is so supported rather than when it is supported in a true horizontal position. The motor 11 engages the base support 1 to hold the device in position during operation so that the disc 9 will be positioned at a slight angle to the horizontal. The peelings which are removed by the abrasive surface of the disc 9 pass out through the spout 21 onto the trough 22 and from thence into a suitable container and any peelings which work their way beneath the abrasive disc 9 are expelled by the curved vanes 26. No water is required during the peeling operation, and after the potatoes or vegetables have been peeled the motor 11 is shut off and the device is moved to the tilted position shown in dotted lines in Figure 1 of the drawings and the pot removed, thus removing all of the peeled potatoes or vegetables at one time in a convenient container and eliminating the tedious operation of removing the peeled potatoes or vegetables one at a time.

The pot 15 has a small opening 28 and it is closed in so that water may be poured therethrough into the interior of the container and upon the disc 9 for thorough washing or cleansing of the apparatus, or if it is so desired the device may be thoroughly washed or cleansed with the pot removed by simply pouring water into the housing 6 during rotation of the disc 9.

Any potatoes which due to flat or irregular shape which might have a tendency to lie flat upon the disc 9 and not tumble, will be disturbed and turned or tumbled by the segment 27.

It will be understood that the invention is not to be limited to the specific construction or arrangement of parts shown, but that they may be widely modified within the invention defined by the claims.

What is claimed is:

1. A vegetable peeler comprising a dish-shaped pivotally mounted member having a central opening, a rotatable power-driven bearing extending through said opening and having an abrasive disk thereon, said disk being positioned in the lower portion of said member, and having curved vanes on the lower side thereof extending from the bearing outwardly, said member having a lateral opening extending upwardly to a point above the top surface of said disk, said member being provided with an upwardly extending container for receiving vegetables to be peeled, whereby vegetables in said container will be peeled by action of said disk, the peelings expelled through said opening and the peelings which find their way below said disk will be expelled by action of said vanes.

2. A vegetable peeler as claimed in claim 1 wherein the upper limit of said lateral opening is a spaced distance from the top surface of said disk to provide an opening sufficiently large to discharge peelings but not to discharge potatoes.

References Cited in the file of this patent

UNITED STATES PATENTS

| Number | Name | Date |
|---|---|---|
| 1,284,314 | Gora | Nov. 12, 1918 |
| 1,664,304 | McCathron | Mar. 27, 1928 |
| 1,730,517 | McCathron | Oct. 8, 1929 |
| 1,933,764 | Ruth | Nov. 7, 1933 |
| 2,033,903 | Smith | Mar. 10, 1936 |
| 2,138,716 | Truitt | Nov. 29, 1938 |
| 2,148,251 | Wortelboer | Feb. 21, 1939 |

FOREIGN PATENTS

| Number | Country | Date |
|---|---|---|
| 445,897 | Germany | June 20, 1927 |